Patented May 1, 1923.

1,453,571

UNITED STATES PATENT OFFICE.

EARL P. STEVENSON, OF NEWTON, MASSACHUSETTS.

PROCESS FOR TREATING PHOSPHATE ROCK.

No Drawing.    Application filed January 15, 1921.   Serial No. 437,579.

*To all whom it may concern:*

Be it known that I, EARL P. STEVENSON, a citizen of the United States, residing at Newton, in the county of Middlesex and State of Massachusetts, have invented certain new and useful Improvements in Processes for Treating Phosphate Rock; and I do hereby declare the following to be a full, clear, and exact description of the invention, such as will enable others skilled in the art to which it appertains to make and use the same.

The present invention relates to methods of treating crude pebble phosphate to increase the bone phosphate of lime content and is a continuation in part of my earlier application filed August 14, 1920, Serial No. 403,544.

The crude pebble phosphates such as occur naturally in Florida have in general a bone phosphate of lime content averaging below seventy-four per cent. The hard phosphate rocks which may contain a substantially higher percentage of bone phosphate of lime averaging above seventy-four per cent are accorded a different classification and command a substantially higher price in the market.

It will be recognized by those skilled in the art that pebble phosphate in its naturally occurring form contains water and organic matter which may be driven off by heating to a comparatively low temperature with a resultant slight increase in the bone phosphate of lime content which is generally insufficient, however, to place the phosphate in the premium class. This bone phosphate of lime content, however, may be substantially increased if the rock is subjected to calcining at higher temperature to break up the calcium carbonate present into carbon dioxide and free lime. Unless the free lime produced by this heating is fixed, however, the increase of bone phosphate of lime is not permanent, due to the tendency of the free lime to recombine with carbon dioxide from the air reforming calcium carbonate. Accordingly, certain prior processes have attempted to secure a permanent increase in the bone phosphate of lime content by heating the phosphate rock to a temperature which will cause a combination of the free lime with silica which may be either present in the rock or added thereto. This combination of the free lime with silica forms a silicate and permanently fixes the lime. This method of disposing of the free lime although it does result in a permanent increase in the bone phosphate of lime content has certain disadvantages which seriously militate against the use of the process. Perhaps the most serious of these disadvantages is due to the fact that the sintered product produced as the result of the reaction between the lime and silica forms a sticky product when the commercial phosphate is later treated to make it available for fertilizing purposes. In addition the completion of the reaction between the silica and the lime requires a heating of the phosphate rock to a temperature of 2500° F. approximately which necessarily involves the expenditure of a large amount of fuel with its attendant expense.

I have discovered that it is possible to secure a permanent increase in the bone phosphate of lime content by heating the crude pebble phosphate containing calcium carbonate to temperatures ranging from 1800° F. to 2000° F. approximately, in order to break up the calcium carbonate into carbon dioxide and free lime with a subsequent recombination of the free line to form a basic phosphate. The operation of this process results in a permanent increase in the bone phosphate of lime content and in addition yields a non-sintered product which lends itself readily to further treatment for the production of a fertilizing material.

An actual example of crude pebble phosphate which may be advantageously treated by my new process contains tricalcium phosphate, calcium carbonate, moisture and organic matter in substantially the following proportions:

Tricalcium phosphate_____ 71.02%
Calcium carbonate_____ 5.10%
Moisture_____ 0.69%
Organic matter_____ 1.93%

Upon heating this rock the moisture and organic matter are driven off together with carbon dioxide gas which is evolved as the result of the decomposition of calcium carbonate. Thereafter the tricalcium phosphate undergoes a slight decomposition into basic phosphate an approximate formula of which is expressed as follows:

$$YCaO[Ca_3(PO_4)_2]x$$

and phosphoric anhydride the latter combining with the free lime to form a basic phosphate, this reaction being substantially complete at a temperature of 2000° F. or less. This process secures the maximum permanent increase in the bone phosphate of lime content by eliminating substantially all of the volatile constituents from the crude pebble phosphate and fixes the free lime to prevent a subsequent recombination with carbon dioxide. Furthermore the product resulting from the process is a friable material which may be readily handled and which does not produce a sticky product when subsequently treated to make it available for fertilizing purposes.

The fixing of the free lime in the form of a silicate requires a substantially higher temperature to complete the reaction which will vary in accordance with the composition of the material but approximates 2500° F. This reaction is evidenced by sintering and a gradual fluxing of the material under treatment so that the completed product has a sintered glassy appearance. Furthermore when this material is converted for fertilizing purposes a sticky objectionable product is formed.

It will be obvious to those skilled in the art that my new process has certain distinct advantages due to the reduced temperature at which the reaction takes place and the improved product which is obtained. The process is furthermore free from the objectionable features of prior processes which require substantially higher temperatures and which have certain disadvantages due to the inherent characteristics of the reaction.

I claim—

1. A process for treating pebble phosphate initially containing tricalcium phosphate, calcium carbonate, moisture and organic matter, which consists in heating the crude phosphate without addition of other materials, to a temperature not over 2,000 degrees Fahrenheit approximately to decompose the calcium carbonate and cause a substantially complete conversion of the free lime resulting from the decomposition of the calcium carbonate, as phosphate.

2. The process of treating pebble phosphate which consists in heating the crude pebble phosphate to a temperature of 1,800 to 2,000 degrees Fahrenheit approximately to decompose the calcium carbonate into free lime and carbon dioxide and partially dissociate the tricalcium phosphate, the products of dissociation combining with the free lime at these temperatures in a manner to permanently fix the latter.

3. A process for increasing the phosphate content in pebble phosphate which consists in calcining the rock at a temperature sufficiently high to cause the conversion of the calcium carbonate present in the rock into additional phosphate.

EARL P. STEVENSON.